United States Patent [19]

Sakakibara

[11] Patent Number: 4,900,902
[45] Date of Patent: Feb. 13, 1990

[54] DATA COMMUNICATION APPARATUS
[75] Inventor: Kenzo Sakakibara, Yokohama, Japan
[73] Assignee: Canon Kabushiki Kaisha, Tokyo, Japan
[21] Appl. No.: 942,208
[22] Filed: Dec. 16, 1986
[30] Foreign Application Priority Data
Dec. 19, 1985 [JP] Japan ................... 60-286696
Dec. 19, 1985 [JP] Japan ................... 60-286697
[51] Int. Cl.⁴ ............................................. G06F 15/20
[52] U.S. Cl. ...................................... 235/375; 235/436; 235/441; 379/144; 382/2
[58] Field of Search ............... 235/492, 379, 380, 441, 235/436, 375; 902/22; 382/2; 379/144, 100

[56] References Cited
U.S. PATENT DOCUMENTS

| | | | |
|---|---|---|---|
| 3,803,350 | 4/1974 | Lemelson | 358/102 |
| 3,896,266 | 7/1975 | Waterbury | 379/144 X |
| 4,052,739 | 10/1977 | Wada et al. | 283/904 X |
| 4,179,686 | 12/1979 | Bonicalzi et al. | 382/2 |
| 4,187,498 | 2/1980 | Creekmore | 235/379 X |
| 4,517,412 | 5/1985 | Newkirk et al. | 379/144 X |
| 4,554,591 | 11/1985 | Kee | 382/2 X |
| 4,667,088 | 5/1987 | Kramer et al. | 235/492 X |
| 4,712,103 | 12/1987 | Gotanda | 235/382 X |

Primary Examiner—David L. Trafton
Attorney, Agent, or Firm—Fitzpatrick, Cella, Harper & Scinto

[57] ABSTRACT

A data communication apparatus having a data transmitting portion, a data receiving portion, a detachable memory device such as an IC card or optical card in which received items of data are memorized, and a controller for controlling the process of transmitting and receiving data. In the memory device is set identification codes for identifying the receiver in a confidential communication process. The form of data transmitted by this apparatus is preliminarily converted in accordance with the function of the other party's apparatus.

36 Claims, 10 Drawing Sheets

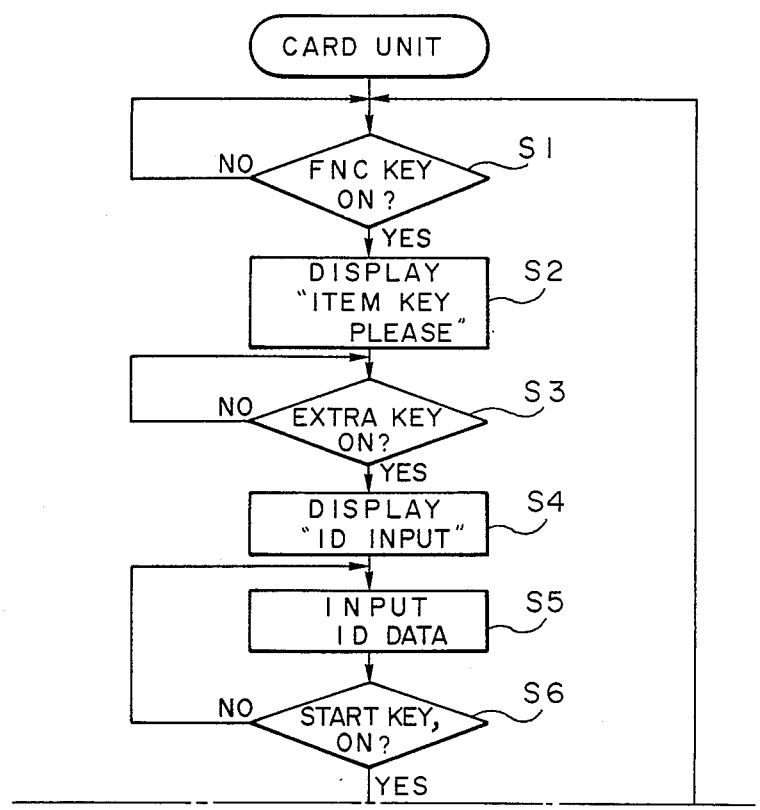

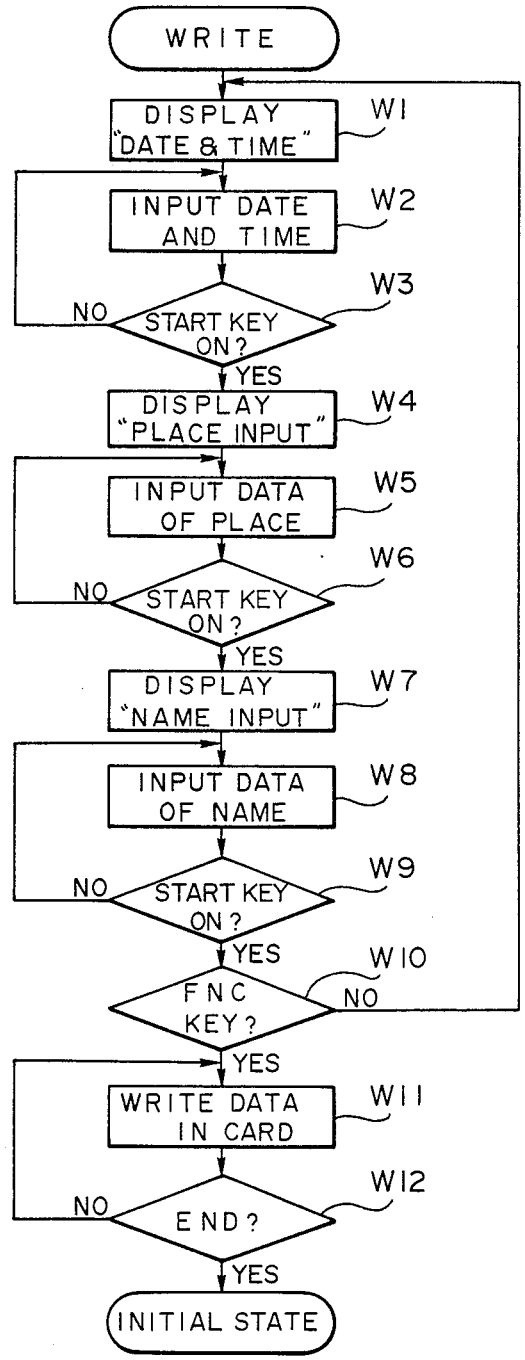

FIG. 4

| Y.M.D. | H:M | PLACE | | NAME | TEL NUMBER |
|---|---|---|---|---|---|
| 85.3.29 | 15:30 | CONF ROOM | No.1 | SUZUKI | 123-4567 |

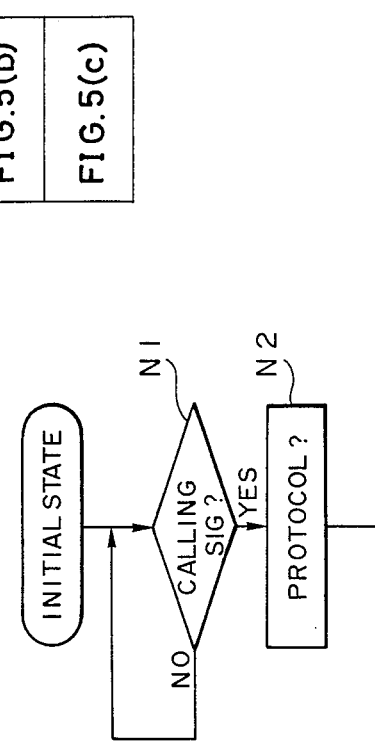

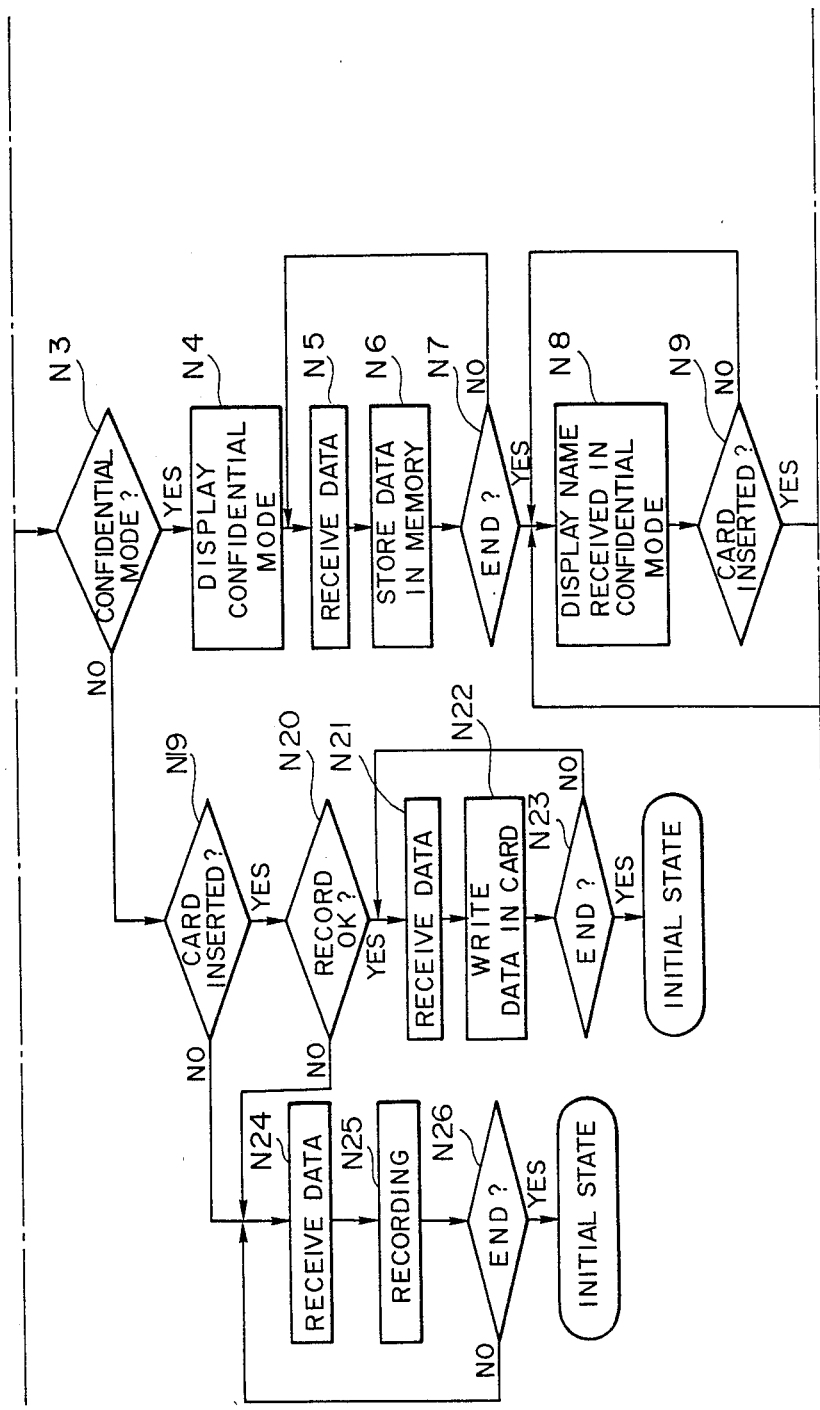

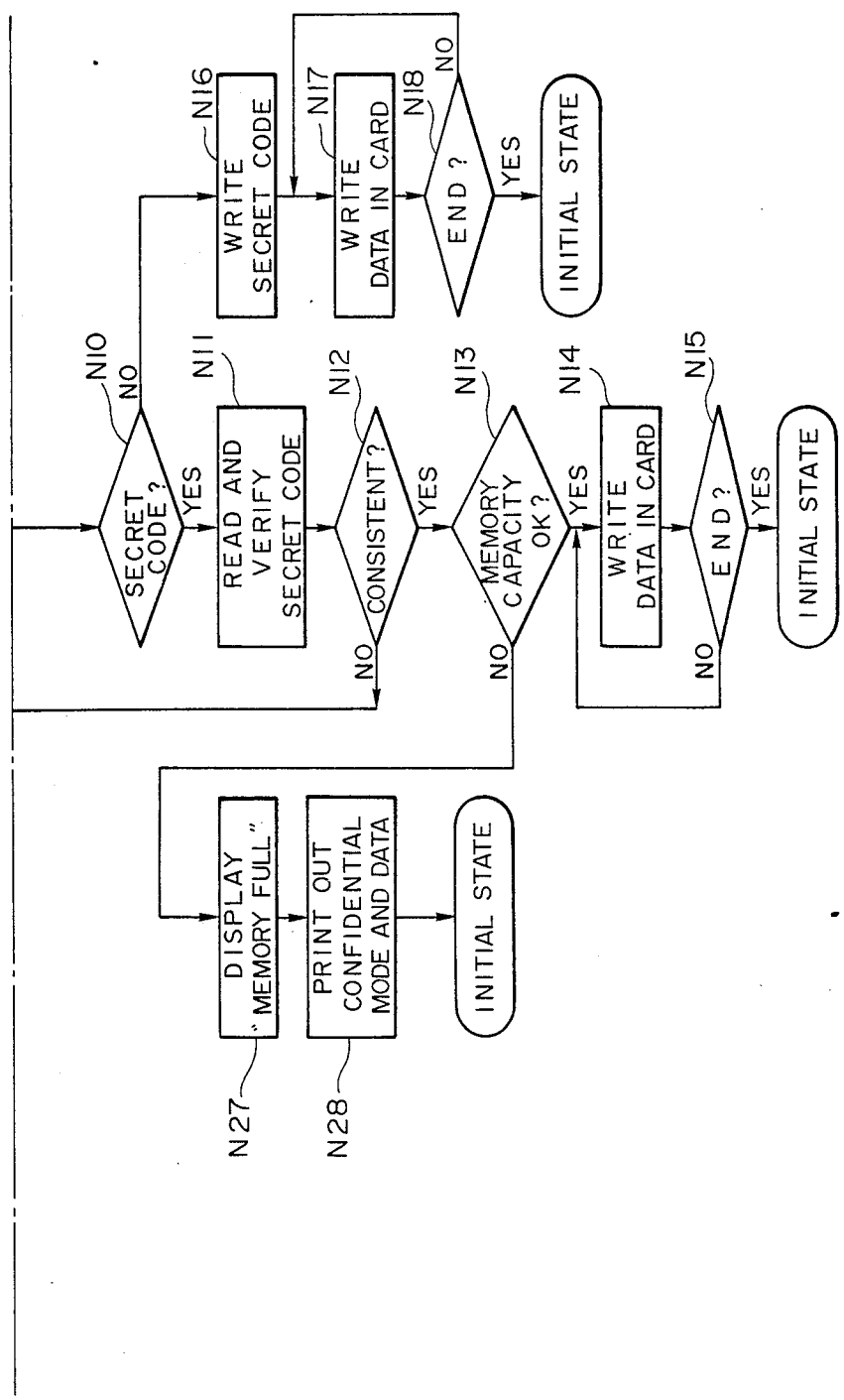

4,900,902

DATA COMMUNICATION APPARATUS

BACKGROUND OF THE INVENTION

1. Field of the Invention

This invention relates to a data communication apparatus.

2. Related Background Art

In the field of conventional apparatus of this kind, a type of facsimile apparatus for image data communication is known whereby the number of communication sheets, the communication fee, etc., are administrated by employing a magnetic card having a small memory capacity.

In general, magnetic cards are adapted for use in, for example, automatically dialing a telephone number on the basis of preliminarily memorized numbers stored in a magnetic card, or allowing a limited number of users to use a system of on the basis of previously memorized ID (identification data) numbers, passwords, etc, stored in a card and comparison thereof with a number input by the user.

It has only been possible for such magnetic cards to be adapted for auxiliary purposes since their memory capacity is small.

On the other hand, IC cards having larger memory capacity have been recently developed, and the field in which such devices are being applied is widening.

SUMMARY OF THE INVENTION

It is an object of the present invention to improve upon existing data communication apparatus and to allow a data communication to be effected by means of a card having a memory medium in view of the above-described circumstances.

It is another object of the present invention to provide a data communication apparatus for transmitting data stored in a card.

It is still another object of the present invention to store received data in a card.

It is a further object of the present invention to effect confidential communication by employing a detachable memory medium.

It is still further object of the present invention to transmit data stored in a card after converting the data in accordance with the apparatus used on the other side.

Other objects and features of the present invention will be more fully appreciated upon reading the following descriptions of the preferred embodiments.

BRIEF DESCRIPTION OF THE DRAWINGS

FIG. 3C is a flowchart of a WRITE routine;

FIG. 4 is a table of an example of output data; and

FIG. 5, composed of FIGS. 5(a) to 5(c), is a flowchart of a card reception process.

DETAILED DESCRIPTION OF THE PREFERRED EMBODIMENTS

One of the preferred embodiments of the present invention will be described in detail with reference to the accompanying drawings.

Figure 1:
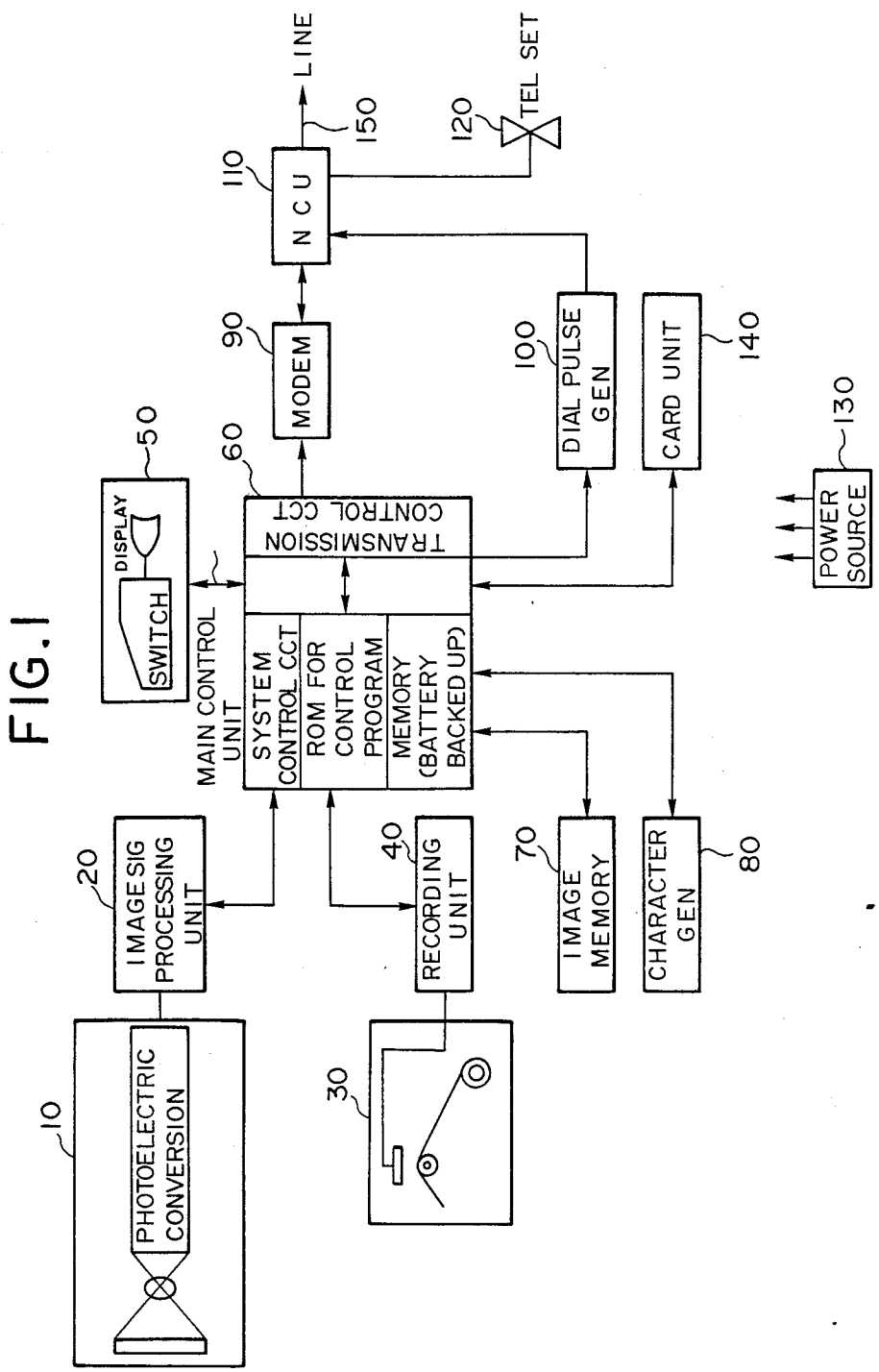
FIG. 1 is a block diagram of the entire arrangement of an embodiment of the present invention.

FIG. 1 shows in a block diagram the overall arrangement of this embodiment.

As shown in FIG. 1, a reading portion 10 for reading images from original sheets is constituted by a CCD line sensor, an original transferring motor, etc.

An image signal processing unit 20 which effects binarization and run-length coding of image data is constituted by a binarization circuit, a run-length encoder, etc.

A recording output unit 30 for recording image data on a sheet of recording paper is constituted by e.g., a thermal printer.

A recording unit 40 carries out a process in which image data encoded in the manner of run-length coding is decoded and output to the recording output unit 30.

A control and display portion 50 through which a facsimile apparatus is operated is constituted by a plurality of key input switches, a display unit made of, e.g., liquid- crystal, a key input scanning circuit, a driving circuit for driving the display unit, etc.

A main control unit 60 effects the overall control of the facsimile apparatus. The main control unit 60 is constituted by a system control circuit, a transmission control circuit, a control program ROM, a battery backup memory, etc. Each control circuit is constituted by a microcomputer. The main control unit 60 encodes or decodes image data in accordance with an encoding or decoding method such as modified Huffman (MH) coding or modified READ (MR) coding.

A memory 70 which is adapted for memorizing image data has a capacity for memorizing a plurality of pages of image data.

A character generator 80 develops character codes. Font data which corresponds to the character codes is stored in the character generator 80.

A modem 90 encodes or decodes image data.

A dial pulse generator 100 supplies a line 150 with dial pulses in accordance with dial data output from the main control unit 60. The dial pulse generator 100 has the function of generating tone dial signals and outputs a tone dial signal if the line 150 is tone dial circuit.

A net control unit (NCU) 110 is adapted for connecting the circuit 150 to a telephone set 120 or to the modem 90.

A power source circuit 130 supplies portions of the facsimile apparatus with electric power.

A card unit 140 reads data from an IC card or writes data into the IC card. The IC card is inserted into the card unit 140.

Figure 2:
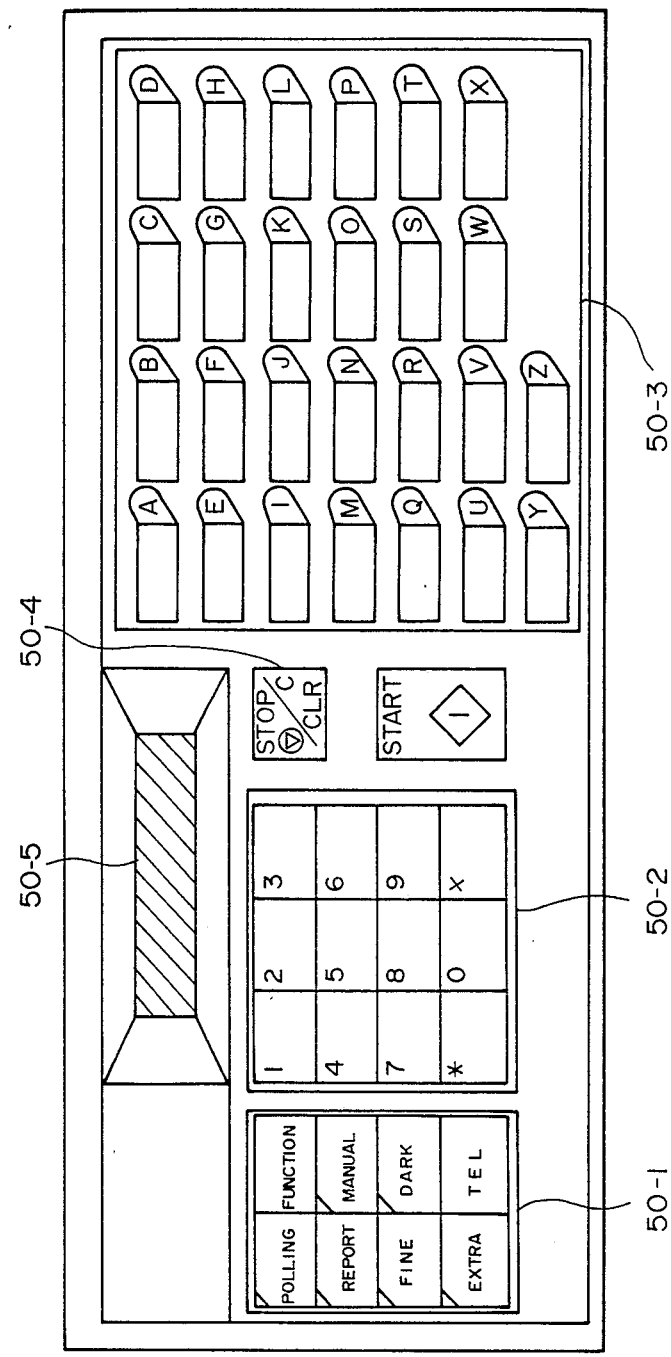
FIG. 2 is an illustration of a control and display portion 50.

As shown in FIG. 2, the control and display portion 50 is constituted by a plurality of function keys 50-1, a ten key cluster 50-2, touch keys 50-3, a stop/clear key 50-4, display unit 50-5.

The facsimile apparatus is composed of these constituents. The operation of the card unit 140 which is started by a predetermined key input through the operation and display portion 50 will be described below.

Figure 3A:
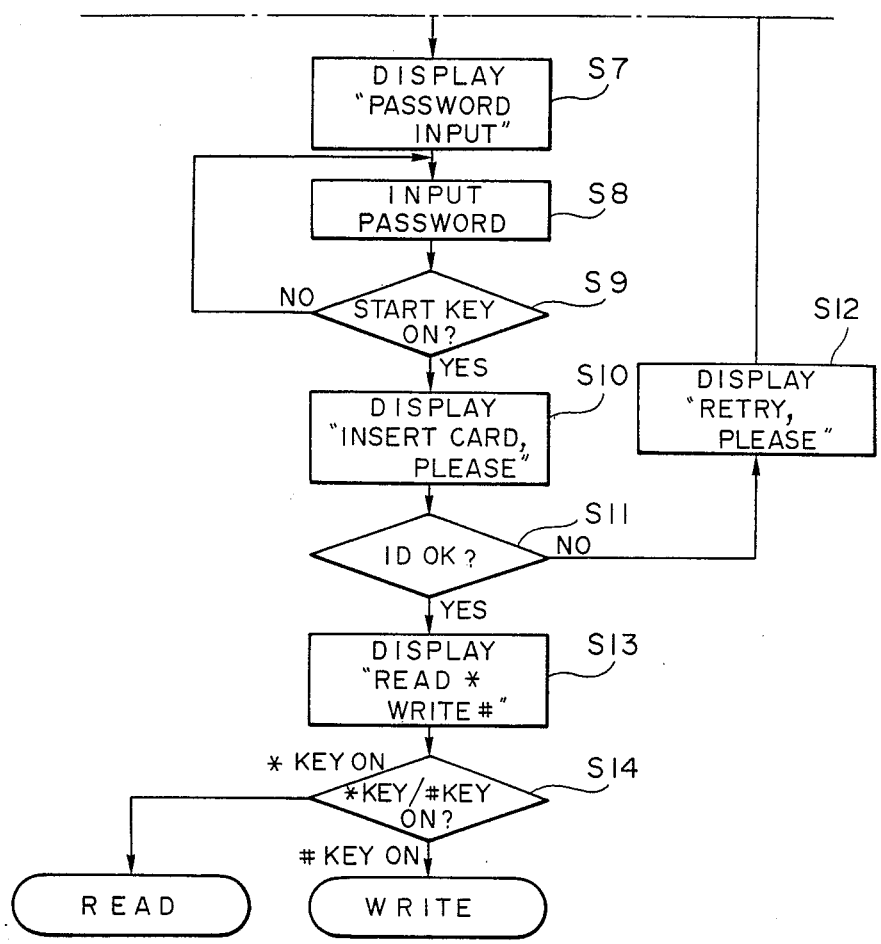
FIG. 3A, composed of FIGS. 3A(a) and 3A(b), is a flowchart of a card unit routine.

FIGS. 3A(a) 3B and 3C are flowcharts of the control operation of the main control unit 60 when the card unit is employed.

In Step S1 shown in FIG. 3A, judgement is made as to whether or not the function key (refer to FIG. 2) has been turned on. If it has been turned on, an instruction indication such as "ITEM KEY, PLEASE" is displayed in Step S2 by the display unit 50-5.

In Step S3, judgement is made as to whether or not an EXTRA key (referred to FIG. 2) has been turned on. If EXTRA key is on, a display "ID INPUT" is effected in Step S4. The operator inputs ID data by means of the ten key cluster 50 2 and the touch keys 50-3 in response to the display "ID INPUT" effected by the display unit 50-5. In Step S5, the ID data input by the ten key cluster 50-2 and the touch keys 50-3 is stored in a temporary memory, namely, a RAM (random access memory) of the main control unit 60. When a START key is thereafter turned on in Step S6, the process proceeds to Step S7.

In Step S7, a display "PASSWORD INPUT" is effected by the display unit 50-5. The operator inputs the data of a password by means of the ten key cluster 50-2 and the touch keys 50-3 in response to the display "PASSWORD INPUT". Then, in Step S8, the data of the password input by the ten key cluster 50-2 and the touch keys 50-3 is stored in a temporary memory of the memory of the main control unit 60. The process proceeds to Step S10 after the on state of the start key has been confirmed in Step S9. Incidentally, the reason for inputting the ID data and the password in Steps S4 to S6 and S7 to S9 is that the maximum possible number of combinations of ID code figures can be increased by combining two types of ID codes.

After the on state of the start key has been confirmed in Step S9, a display "INSERT CARD, PLEASE" is effected by the display unit 50-5 in Step S10.

In Step S11, the ID data and the password which have been input are collated with the number of the card. If the result of the collation shows that the data and the password are correct (the input ID and password data corresponds to the ID and password data of the card), the process proceeds to Step S13. If the result shows that they are incorrect (the input ID and password data do not correspond to the ID and password data of the card), a display "RETRY, PLEASE" is effected in Step S12, and the process proceeds to Step S1.

When the process proceeds from Step S11 to Step S13, a display "READ* WRITE#" is effected by the display unit 50-5. If it is judged in Step S14 that a "*" key (refer to FIG. 2) has been turned on, the process enters into a READ routine. If it is judged that a "#" key has been turned on, the process enters into a WRITE routine.

Figure 3B:
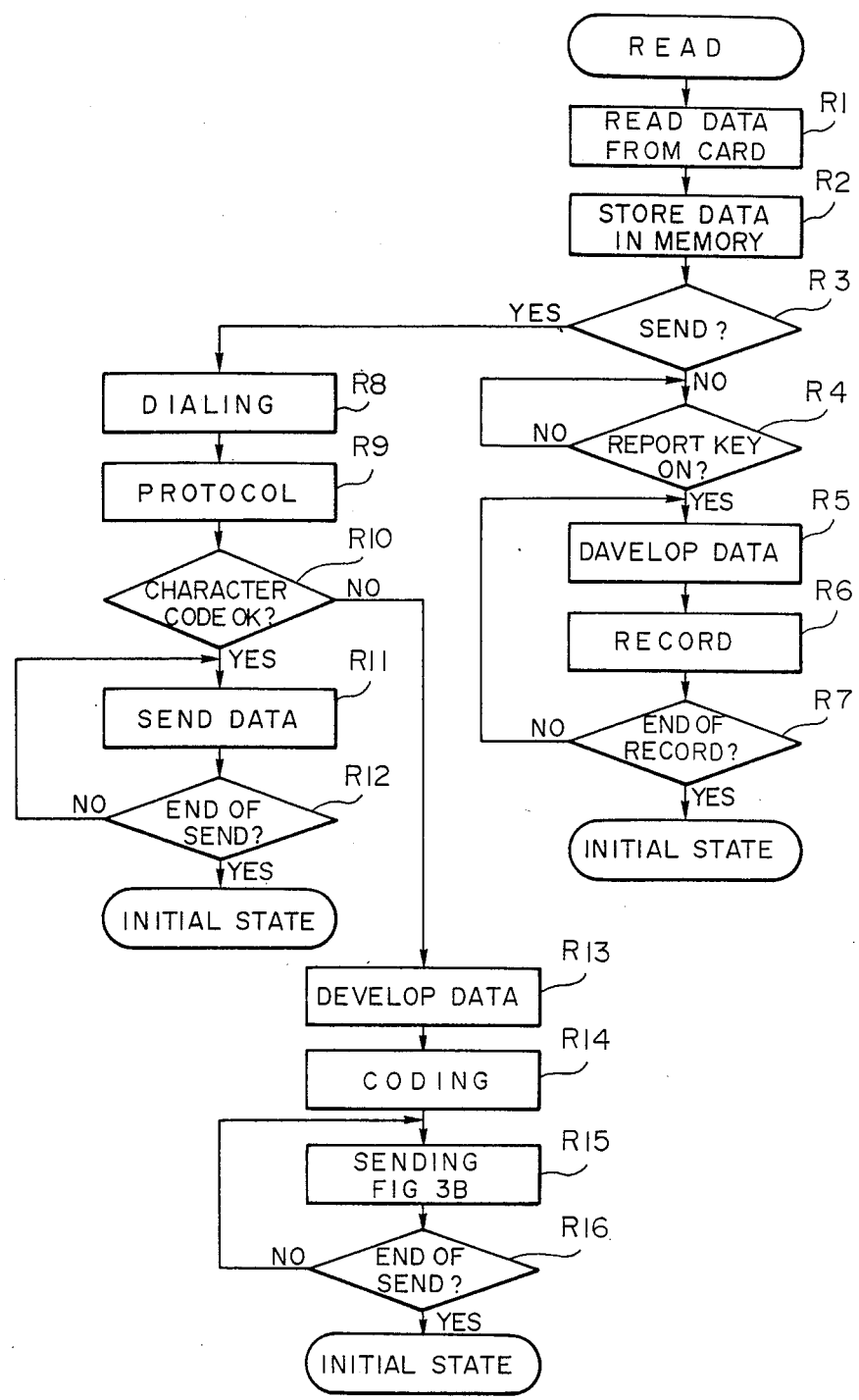
FIG. 3B is a flowchart of a READ routine.

FIG. 3B shows a flowchart of the READ routine. In the READ routine, data is read from the card to perform a pintout operation or a data transmission process.

In Step R1, when a read instruction signal is supplied to the card unit 140, the data is read through the card unit 140. The data read from the card is stored in the temporary memory of the main control unit 60.

In Step R3, a judgement is made as to whether or not the dial code of the other party has been input and whether or not the start key has been switched on, thereby deciding whether or not the data transsmission process is to be carried out. If it is appropriate to effect the data transmission, the process proceeds to Step R8. If it is not appropriate, the process proceeds to Step R4.

In Step R4, it is confirmed that a REPORT by (refer to FIG. 2) has been switched on (the operator turns on the REPORT key when the data of the card is to be printed out). If the data which has been stored in the temporary memory of the main control unit 60 is character code data, the data of the card is developed by the character generator 80 into picture element data, temporarily memorized in the image memory 70, and thereafter recorded on the recording paper by the recording output unit 30, in Steps R5, R6 and R7. If the data of the card stored in the temporary memory of the main control unit 60 is data encoded in accordance with the MH or MR method, it is decoded and supplied to the recording unit 40. This data is further expanded by the recording unit 40 and is thereafter printed out by the recording output unit 30.

When the process proceeds from Step R3 to Step R8, the dial data of the other party which has been input through the ten key cluster 50-2 and the touch keys 50-3 is supplied to the dial pulse generator 100, thereby effecting the dialing to connect the communication line to the receiving side. After the line has been connected to the receiving side, the process proceeds to Step R9.

In Step R9, a facsimile communication procedure (protocol) is carried out. This facsimile communication procedure is effected in accordance with the counsel of CCITT. In this communication procedure, the information on the function of each party's apparatus is exchanged. On the basis of this information, judgement is made in Step R10 as to whether or not it is possible for the other party's apparatus to accept the code data on characters, etc. If it is possible to communicate with the other party with this code data, the data stored in the memory is transmitted in Steps R11 and R12.

If the code communication is judged, in Step R10, to be inappropriate, the process proceeds to Step R13, and the data stored in the temporary memory of the main control unit 60 is developed into picture element data and in temporarily memorized in the image memory 70. Then, in Step R14, the image data stored in the image memory 70 is encoded in the manner of MH (Modified Huffman) coding, MR (Modified READ) coding, or the like and is thereafter transmitted in Steps R15 and R16. The judgement in Step R10 with respect to the possibility of the code communication is made when the data stored in the card is code data.

In the above-described READ routine, the data of the card is printed out by the recording output unit 30 or transmitted to the other party.

FIG. 3C shows a flowchart of a WRITE routine. The data which is to be written in the card may include the code data input through the control and display portion 50 or the original image data read through the reading portion 10. In this embodiment, the data to be written is exemplified by the items showning FIG. 4 and the data write process will be described with respect to these items of data.

In Step W1 shown in FIG. 3C, a display "Year, Month, Day, Hour, Minute" is effected by the display unit 50-5. The operator inputs the data on the year, month, day, hour and minute by means of the ten key cluster 50-2 and the touch keys 50-3 in response to the display "Year, Month, Day, Hour, Minute" of the dispaly unit 50-5.

In Step W2, the data on the year, month, day, hour and minute input by means of the ten key cluster 50-2 is stored in the temporary memory of the main control unit 60. When the start key is switched on, the process proceeds to Step W4.

In Step W4, a display "PLACE INPUT" is effected by the display unit 50-5. The operator inputs the data on the place by means of alphabet keys included in the touch keys 50-3 in response to the dispaly "PLACE INPUT". In Step W5, the data on the place input through the touch keys 50-3 is stored in the temporary memory of the main control unit 60. After the on state of the start key has been confirmed in Step W6, the process proceeds to Step W7.

In Step W7, a display "NAME INPUT" is effected by the display unit 50-5. The operator inputs the data on the name and the telephone number of the other side by means of the touch keys 50-3 in response to the display "NAME INPUT". In Step W8, the data on the name and the telephone number of the other party input through the touch keys 50-3 is stored in the temporary memory of the main control unit 60. After the on state of the start key has been confirmed in Step W9, the process proceeds to Step W10.

After the on state of the function key (refer to FIG. 2) has been confirmed in Step W10, the process proceeds to Step W11. If the function key is not switched on, the process proceeds to Step W1, and the data input is again effected through the keys.

When the process proceeds from Step W10 to Step W11, each of the above-described items of data which has been stored in the memory is supplied to the card unit 140 and is written in the card which has been inserted into the card unit 140.

FIG. 4 shows the examples of the items of data which are written in the process shown in FIG. 3C are shown. However, the process of writing data in the card is not limited to the WRITE routine of FIG. 3C. Sentences based on ordinary character codes, image data read through the reading portion 10, or data in which character codes and items of image data are mixed may be written. Image data is compressed by being encoded in the manner of MH or MR coding or the like before it is written into the card. If character codes and items of image data have been mixed, a discrimination code for identifying a character code or an item of image data may be placed in front of each item of data before the data is written into the card. Also, in the case of the data transmission described in conjunction with FIG. 3B, if the apparatus on the receiving side has the function of receiving data in which character codes and items of image data are mixed, the data read from the card may be transmitted in the same form, and, if the apparatus on the receiving side does not have the function of receiving mixed data, the data is entirely converted into image data before it is transmitted.

As described above, the data stored in the card can be changed through the control and display portion of the facsimile apparatus.

It is possible for the data stored in the card to be output by being recorded (printed out) on recording paper by the recording output unit 30 of the facsimile apparatus.

If is also possible for the data stored in the card to be transmitted as character code data or image data to the apparatus on the other side.

The invention will now be described with respect to the process of recording or writing received data into a card.

FIG. 5 shows a flowchart of the process of writing received data into a card.

In Step N1 shown in FIG. 5, a calling signal supplied from the line is confirmed. The facsimile communication procedures (protocols) are exchanged. The communication mode is determined on the basis of the information on communication modes in protocols exchanged. On the basis of this information on communication modes, judgement is made as to whether or not the confidential mode has been selected (whether or not the other party hopes to communicate in the confidential mode). If the confidential mode has been selected by the other party (by the apparatus on the transmission side in this case), the process proceeds to Step N4. If the confidential mode has not been selected, the process proceeds to Step N19.

In Step N4, the display unit 50-5 is made to show that the communication will be performed in the confidential mode (by e.g., a display "CONFIDENTIAL RECEPTION"). In Steps N5, N6 and N7, image data is received and is stored in the image memory 70. In this case, the image data is stored in the image memory 70 as encoded in the manner of MH or MR coding or the like.

In the confidential reception process, codes or items of data such as a code for identifying the state of confidential communication, a code for indicating a receiver of the confidential communication, an item of data on the name of the receiver, and items of information on the name of the receiving side, telephone number, etc., are placed in front of each item of image data.

In Step N8, the data on the name of the receiver of the confidential communication is displayed by the display unit 50-5, thereby enabling the operator on the receiving side to ascertain to whom the confidential communication is being directed.

Then, the operator inserts a card, which corresponds to the name of the receiver display by the display unit 50-5, into the card unit 140. The process then proceeds from Step N9 to Step N10, and a judgment is made as to whether or not the appropriate identification codes have been set in the card which has been inserted into the card unit 140. If it is judged in Step N10 that the identification codes have been set in the card, the process proceeds to Step N11. If the card does not have the proper identification codes set therein, the process proceeds to Step N16. In Step N16, the identification codes for confidential communication are set in the card, thereby inhibiting reading of the data of the card before corresponding identification codes for confidential communication are input into the apparatus.

In Steps N17 and N18, the data which has been stored in the image memory is written into the card.

If it is judged that identification codes have been set in the card, the process proceeds from Step N10 to Step N11, and the identification codes are read from the card and are compared with the identification codes for confidential communication. If, in Step N12, they are judged to be consistent after being compared with each other, the process proceeds to Step N13. If they are inconsistent, the process returns to Step N8, and the display unit 50-5 effects an instruction display for instructing the operator to insert the card again.

When the process proceeds from Step N12 to Step N13, the remaining capacity of the card is compared with that of the data received. If the card has a sufficient capacity to write, the data is written into the card in Steps N14 and N15. If it is not possible to write in Step N13, the process proceeds to Step N27, and a display for showing that the remaining capacity of the card is not enough to write, e.g., a display "MEMORY FULL" is effected. In Step N28, the data on the name of the receiver of the confidential communication is printed out by the recording output unit 30.

If, in Step N3, the confidential mode has not been selected, the process proceeds to Step N19, and judgement is made as to whether or not a card has been inserted into the card unit 140. If a card has been inserted, the process proceeds to Step N20. If there is no card inserted, the process proceeds to Step N24.

Before the received data is written into the card, the number of original sheets of the data to be received in accordance with the protocal confirmed in Step N2 is compared with the available capacity of the card in Step N21. If it is possible to record, the data is received and written into the card by means of the card unit 140 in Steps N21, N22, N23. This process of comparing the amount of received data with the available capacity of the card is the same as that described above with respect to Step N13.

If it is judged in Step N19 that there is no card inserted into the card unit 140 or if it is judged in Step N20 that it is not possible to record, the data is received and printed out by the recording output unit 30 in Steps N24, N25 and N26.

When the data is written into the card, the data is stored in the same form as that given by the encoding such as MH or MR coding in order to minimize the amount of data memorized in the card, thereby enabling a larger number of original sheets of data to be input.

As described above in conjunction with FIG. 5, personal cards may be provided in advance and identification codes for identifying a person may be applied to each card. The operator can select one of these cards in accordance with the displayed name of the receiver of the confidential communication, thereafter inserting a selected personal card into the card unit 140. The confidential communication data is thereby written into the card. The confidential communication data cannot be read out and reproduced from the card before the identification codes have been provided, as described above in conjunction with FIG. 3B.

Since the confidential communication data is written into a card for a particular person, the receiver to whom the confidential communication data should be given, it can be speedily delivered to the receiver of the confidential communication.

Heretofore, in an ordinary confidential reception process, it has been necessary to preserve confidential communication data in a memory until an identification code is input by the receiver and the confidential communication data which has been stored in the memory is output. However, it is possible to constantly effectively utilize the memory of the facsimile apparatus by writing the confidential communication data into the card. Incidentally, in the confidential reception process, other memorizing media such as a floppy disk in which identification codes are set, or a detachable ROM are also applicable.

In an ordinary data reception process also, it is possible to save recording paper by writing received data into a read-write card. This method is also highly effective in terms of preservation and administration of data.

The present invention has been described with respect to the embodiment which employs IC cards as read-write cards. However, optical cards having an optical storage medium capable of optically recording or reproducing information are now being provided. It is possible to increase the amount of recorded data by adapting such optical cards for the arrangements of these embodiments, since the memory capacity of optical cards, is larger than that of ID cards. The card unit 140 in this embodiment may if desired be replaced with an optical card unit adapted for optical cards.

The present invention has been described by way of example of a facsimile apparatus, but the apparatus in accordance with the present invention may include any types of data communication apparatus such as telex apparatus for effecting character code data communication. When the present invention is applied to a telex system, all items of data are written, in the form of character code data, into a card.

As described above, the present invention provides a data communication apparatus which can allow data communication to be effected by means of a card having a recording medium.

In the embodiments of the present invention, when specific codes applied to a recording medium correspond to those applied to received data, the received data is memorized in the above-described storage medium. The apparatus in accordance with the present invention is thus arranged, thereby facilitating the preservation and administration of confidential communication data and improving the process of receiving data in the manner of confidential reception.

What is claimed is:

1. A data communication apparatus comprising:
data transmitting means for transmitting data;
reading means for reading data stored in a card having a storage medium, said card being capable of storing character code data and image data therein; and
controlling means for controlling said data transmitting means to transmit the data stored in said card;
wherein said controlling means discriminates a function of a destination apparatus and converts the character code data stored in said card to image data in accordance with the function of said destination apparatus, thereafter effecting data transmission.

2. An apparatus according to claim 1, wherein said controlling means is adapted to send the character code data stored in said card without converting the same into image data when it is discriminated that said destination apparatus has a function of reception of character code data.

3. An apparatus according to claim 2, wherein said controlling means is adapted to convert said character code data stored in said card into image data and to send the converted image data when it is discriminated that said destination apparatus does not have a function of reception of character code data.

4. An apparatus according to claim 1, wherein said controlling means is adapted to discriminate whether data stored in said card is character code data or image data.

5. An apparatus according to claim 1, wherein image data stored in said card is encoded image data.

6. An apparatus according to claim 1, further comprising output means for outputting data, and means for selecting whether data stored in said card is transmitted by said data transmitting means or output by said output means, wherein said controlling means transmits or outputs data stored in said card in accordance with the selection effected by said selecting means.

7. A data communication apparatus according to claim 1, further comprising operating means for operating said data communication apparatus, wherein said controlling means effects the control of data transmission and the control of writing data into said card on the basis of the input supplied by said operating means.

8. A data communication apparatus comprising:

data receiving means for receiving data;
writing means for writing data into a card having a storage medium;
output means for outputting data received by said data receiving means; and
controlling means for controlling said writing means to write data received by said data receiving means into said card;
wherein said controlling means selects whether said received data is outputted by said output means or written into said card, and
wherein said controlling means judges whether or not said received data can be written into said card, and wherein said controlling means writes said received data when judging that said received data can be written into said card.

9. A data communication apparatus according to claim 8, wherein said data receiving means receives image data, and wherein said controlling means writes image data received by said data receiving means into said card.

10. A data communication apparatus according to claim 9, wherein said data written in said card is encoded image data.

11. A data communication apparatus according to claim 8, wherein said controlling means controls said writing means to write said received data into said card on condition that said card has been set in said writing means.

12. A data communication apparatus according to claim 8, wherein, when the storage capacity of said card is sufficient to store the received data said controlling means judges that said card is writable therein.

13. A data communication apparatus according to claim 8, wherein said data receiving means effects the reception of code data, and wherein said controlling means controls to write code data received by said data receiving means into said card.

14. A data communication apparatus comprising:
data receiving means for receiving data;
writing means for writing data into a card having a storage medium; and
controlling means for controlling said writing means to write data received by said data receiving means into said card,
wherein, if said received data has a specific code, said controlling means writes said received data into said card after the same code as said specific code has been set in said card.

15. A data communication apparatus according to claim 14, wherein said specific code is a code for allowing said received data to be output when said specific code is input.

16. A data communication apparatus according to claim 15, further comprising an output means for outputting data stored in said card, and an input means for inputting an instruction whereby data stored in said card is output, wherein said controlling means controls said output means to output data stored in said card on condition that said specific code has been input by said input means.

17. A data communication apparatus comprising:
receiving means for receiving data;
a storage medium in which a specific code is set; and
controlling means for storing data received by said receiving means in said storage medium when a code attached to said received data corresponds to said specific code of said storage medium.

18. A data communication apparatus according to claim 17, wherein said code attached to said received data is a identification code attached to said received data at the time of confidential communication.

19. A data communication apparatus according to claim 18, further comprising display means for displaying data on the name of the receiver attached to said received data in a process of confidential reception.

20. A data communication apparatus according to claim 17, wherein said controlling means stores said received data in said storage medium on condition that said storage medium has a sufficient storage capacity for storing said received data.

21. A data communication apparatus according to claim 17, wherein said receiving means receives image data, and wherein image data stored in said storage medium is encoded image data.

22. A data communication apparatus according to claim 17, wherein said receiving means receives code data.

23. A data communication apparatus according to claim 17, wherein said storage medium is an IC card.

24. A data communication apparatus according to claim 17, wherein said storage medium is a detachable memory.

25. A data communication apparatus according to claim 17, wherein said storage medium is optical card.

26. A data communication apparatus comprising:
transmitting means for transmitting data;
receiving means for receiving data;
read-write means for writing data into a card having a storage medium, and for reading out data from said card;
outputting means for outputting data received by said data receiving means; and
controlling means for controlling said read-write means to read out data stored in said card and for controlling said transmitting means to transmit data thereby read and for controlling said read-write means to write data received by said receiving means into said card,
wherein said controlling means selects whether said received data is outputted by said output means or written into said card, and
wherein said controlling means judges whether or not said received data can be written into said card, and wherein said controlling means writes said received data when judging that said received data can be written into said card.

27. A data communication apparatus according to claim 26, wherein said data transmitting means effects data transmission of image data, and wherein said controlling means converts said code data of said card into image data which is transmitted by said data transmitting means.

28. A data communication apparatus according to claim 26, wherein said controlling means converts data stored in said card in accordance with the function of the other party's apparatus, thereafter effecting data transmission.

29. A data communication apparatus according to claim 26, further comprising means for selecting whether data stored in said card is transmitted by said data transmitting means or output by said output means, and output means for outputting data, wherein said controlling means transmits or outputs data stored in said card in accordance with the selection effected by said selecting means.

30. A data communication apparatus according to claim 26, wherein said data receiving means receives image data, and wherein said controlling means writes image data received by said data receiving means into said card.

31. A data communication apparatus according to claim 26, wherein said controlling means controls said writing means to write said received data into said card on condition that said card has been set in said writing means.

32. A data communication apparatus according to claim 26, wherein, when the storage capacity of said card is sufficient to store the received data, said controlling means judges that said card is writable therein.

33. A data communication apparatus comprising:
 transmitting means for transmitting data;
 receiving means for receiving data;
 read-write means for writing data into a card having a storage medium, and for reading out data from said card; and
 controlling means for controlling said read-write means to read out data stored in said card and for controlling said transmitting means to transmit data thereby read and for controlling said read-write means to write data received by said receiving means into said card,
 wherein, if said received data has a specific code, said controlling means writes said received data into said card after the same code as said specific code has been set in said card.

34. A data communication apparatus according to claim 33, wherein said specific code is a code for allowing said received data to be output when said specific code is input.

35. A data communication apparatus according to claim 34, further comprising an output means for outputting data stored in said card, and an input means for inputting an instruction whereby data stored in said card is output, wherein said controlling means controls said output means to output data stored in said card on condition that said specific code has been input by said input means.

36. A facsimile apparatus comprising:
 reading means for reading character code data stored in a card having a storage medium;
 transmitting means for transmitting data; and
 control means adapted to execute a facsimile communication procedure to communicate a destination apparatus,
 wherein the character code data stored in said card is transmitted to said destination apparatus in accordance with the facsimile communication procedure, and
 wherein said control means discriminates a function of said destination apparatus and, in response to a discrimination that said destination apparatus lacks a function for receiving character code data, said control means converts said character code data into image data and transmits the converted image data.

* * * * *

UNITED STATES PATENT AND TRADEMARK OFFICE
CERTIFICATE OF CORRECTION

PATENT NO. : 4,900,902
DATED : February 13, 1990
INVENTOR(S) : KENZO SAKAKIBARA

It is certified that error appears in the above-identified patent and that said Letters Patent is hereby corrected as shown below:

AT [57] ABSTRACT

Line 6, "is" should read --are--.

COLUMN 1

Line 21, "of" (first occurrence) should be deleted.

COLUMN 3

Line 8, "ten key cluster 50 2" should read --ten key cluster 50.2--.

COLUMN 6

Line 30, "display" (first occurrence) should read --displayed--.

COLUMN 9

Line 32, "data said" should read --data, said--.

COLUMN 10

Line 3, "a" should read --an--.
    Line 27, "optical card." should read --an optical card.--.

UNITED STATES PATENT AND TRADEMARK OFFICE
CERTIFICATE OF CORRECTION

PATENT NO. : 4,900,902

DATED : February 13, 1990

INVENTOR(S) : KENZO SAKAKIBARA

Page 2 of 2

It is certified that error appears in the above-identified patent and that said Letters Patent is hereby corrected as shown below:

COLUMN 12

Line 18, "communicate" should read --communicate with--.

Signed and Sealed this

Tenth Day of March, 1992

Attest:

HARRY F. MANBECK, JR.

*Attesting Officer*  *Commissioner of Patents and Trademarks*